(12) United States Patent
Mou (10) Patent No.: US 10,178,221 B2
(45) Date of Patent: Jan. 8, 2019

(54) TIME SYNCHRONIZATION METHOD AND APPARATUS (71) Applicant: TENCENT TECHNOLOGY (SHENZHEN) COMPANY LIMITED, Shenzhen (CN)

(72) Inventor: Yiju Mou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/351,359

(22) Filed: Nov. 14, 2016

(65) Prior Publication Data

US 2017/0064069 A1 Mar. 2, 2017

Related U.S. Application Data (63) Continuation of application No. PCT/CN2015/079584, filed on May 22, 2015.

(30) Foreign Application Priority Data

May 22, 2014 (CN) .......................... 2014 1 0218815

(51) Int. Cl.
H04W 56/00 (2009.01)
H04L 29/06 (2006.01)
(Continued)

(52) U.S. Cl.
CPC ........ *H04M 1/72566* (2013.01); *H04L 67/36* (2013.01); *H04L 69/28* (2013.01);
(Continued)

(58) Field of Classification Search
CPC ................................ H04L 69/28; H04L 67/36
See application file for complete search history.

(56) References Cited

U.S. PATENT DOCUMENTS

| 2004/0249599 A1* | 12/2004 | Masuda | G08G 1/20 |
| | | | 702/128 |
| 2013/0210531 A1* | 8/2013 | Ivanov | G07F 17/3269 |
| | | | 463/43 |
| 2014/0128147 A1* | 5/2014 | Yu Cheng | G07F 17/3279 |
| | | | 463/25 |

FOREIGN PATENT DOCUMENTS

| CN | 1308302 A | 8/2001 |
| CN | 101325989 A | 12/2008 |
| (Continued) | | |

OTHER PUBLICATIONS

The World Intellectual Property Organization (WIPO) International Search Report for PCT/CN2015/079584 dated Aug. 20, 2015 pp. 1-3.

(Continued)

Primary Examiner — Asghar H Bilgrami
(74) Attorney, Agent, or Firm — Anova Law Group, PLLC (57) ABSTRACT The present disclosure discloses a time synchronization method and apparatus, which belong to the field of the Internet. The method includes: counting down, when a data processing right of a network application is allocated to a first user, a processing time of the first user, the first user being a user in a user group; stopping, when the first user is disconnected and logs in to the network application again in a process of countdown, if a processing operation sent by a first user terminal is received, the process of countdown, to obtain a remaining processing time of the first user, the processing operation including an operation of abandoning the data processing right or a network data processing operation; and sending the remaining processing time to the first user terminal and a second user terminal separately, so that the first user terminal and the second user terminal separately display the remaining processing time, a second (Continued)

user being a user other than the first user in the user group. The present disclosure prevents an error from occurring in time displayed in the first user terminal and the second user terminal.

20 Claims, 5 Drawing Sheets

(51) Int. Cl.
  *H04L 29/08* (2006.01)
  *H04M 1/725* (2006.01)
  *H04W 4/08* (2009.01)
(52) U.S. Cl.
  CPC ......... *H04W 4/08* (2013.01); *H04W 56/0015* (2013.01); *H04M 1/72544* (2013.01)

(56) References Cited

FOREIGN PATENT DOCUMENTS

| | | |
|---|---|---|
| CN | 101380515 A | 3/2009 |
| CN | 101436228 A | 5/2009 |
| CN | 101577715 A | 11/2009 |
| CN | 101706850 A | 5/2010 |
| CN | 101850178 A | 10/2010 |
| WO | 2006074238 A2 | 7/2006 |

OTHER PUBLICATIONS

The State Intellectual Property Office of the People's Republic of China (SIPO) Office Action 1 for 201410218815.7 dated Oct. 29, 2018 7 Pages (including translation).

* cited by examiner

TIME SYNCHRONIZATION METHOD AND APPARATUS

This application is a continuation of PCT Application No. PCT/CN2015/079584, filed on May 22, 2015, which claims priority to a Chinese patent application No. 201410218815.7, filed on May 22, 2014, the content of all of which is incorporated herein by reference in their entirety.

FIELD OF THE TECHNOLOGY

The present disclosure generally relates to the field of the Internet, and in particular, relates to a time synchronization method and apparatus.

BACKGROUND OF THE DISCLOSURE

For some network applications based on the Internet, when a user uses a network application, the user needs to form one user group with another user. For example, the network application is a gomoku game, a Dou Dizhu game, and the like. Each user in the user group has a processing right of processing network data included in the network application, and a remaining processing time of processing network data of each user is displayed on each user terminal. To ensure consistency of time displayed on each user terminal, the time displayed on each user terminal needs to be synchronized.

For the gomoku game, when a first user and a second user form one user group to play the game, a server separately delivers a processing time to a first user terminal and a second user terminal. By using the first user as an example, when it is the first user's turn to play, the first user terminal counts down the processing time delivered by the server, stops countdown of the processing time when the first user terminal receives a stone placed by the first user to obtain a remaining processing time of the first user, and sends, to the server, position information of a position where the stone is located in a board and the remaining processing time. The server sends, to the second user terminal, the position information and the remaining processing time sent by the first user terminal, so that the second user terminal displays the remaining processing time, and displays, in the board according to the position information, the stone placed by the first user.

A user sometimes may use a mobile phone to run the network application, and because a network of the mobile phone is unstable, often the network application may be disconnected. If the first user is suddenly disconnected during processing of network data, when the first user logs in to the network application again, if it is the first user's turn to process network data, the first user terminal starts countdown from a remaining processing time recorded at last time before the first user terminal is disconnected. Because a certain amount of time is required for disconnection and login again, the remaining processing time of the first user then displayed in the terminal may be unequal to an actual remaining processing time, resulting in an error occurring in time displayed by the terminal.

SUMMARY

Embodiments of the present invention provide a time synchronization method and apparatus. The technical solutions are as follows:

A first aspect provides a time synchronization method, the method including:

counting down, when a data processing right of a network application is allocated to a first user, a processing time of the first user, the first user being a user in a user group;

stopping, when the first user is disconnected and logs in to the network application again in a process of countdown, if a processing operation sent by a first user terminal is received, the process of countdown, to obtain a remaining processing time of the first user, the processing operation including an operation of abandoning the data processing right or a network data processing operation; and sending the remaining processing time to the first user terminal and a second user terminal separately, so that the first user terminal and the second user terminal separately display the remaining processing time, a second user being a user other than the first user in the user group.

A second aspect provides a time synchronization method, the method including:

sending, during disconnection and login to a network application again, if a data processing right of the network application is possessed and a processing operation is received, the processing operation to a server, the processing operation including an operation of abandoning the data processing right or a network data processing operation; and receiving a remaining processing time of a first user sent by the server, and displaying the remaining processing time of the first user.

A third aspect provides a time synchronization apparatus, the apparatus including:

a countdown module, configured to count down, when a data processing right of a network application is allocated to a first user, a processing time of the first user, the first user being a user in a user group;

a countdown stop module, configured to stop, when the first user is disconnected and logs in to the network application again in a process of countdown, if a processing operation sent by a first user terminal is received, the process of countdown, to obtain a remaining processing time of the first user, the processing operation including an operation of abandoning the data processing right or a network data processing operation; and a first sending module, configured to send the remaining processing time to the first user terminal and a second user terminal separately, so that the first user terminal and the second user terminal separately display the remaining processing time, a second user being a user other than the first user in the user group.

A fourth aspect provides a time synchronization apparatus, the apparatus including:

a fourth sending module, configured to send, during disconnection and login to a network application again, if a data processing right of the network application is possessed and a processing operation is received, the processing operation to a server, the processing operation including an operation of abandoning the data processing right or a network data processing operation; and a first display module, configured to receive a remaining processing time of a first user sent by the server, and display the remaining processing time of the first user.

In the embodiment of the present invention, when a server allocates, to a first user, a processing right of processing network data included in a network application, a processing time of the first user is counted down; when the first user is disconnected and logs in to the network application again in a process of countdown, if the server receives a processing operation sent by a first user terminal, countdown of the processing time of the first user is stopped to obtain a remaining processing time of the first user; and the remaining processing time of the first user is separately sent to the first user terminal and a second user terminal. The remaining processing time is a remaining processing time that is being updated by the server when the first user terminal is disconnected and logs in again, that is, the remaining processing time is an actual remaining processing time of the first user, thereby preventing an error from occurring in time displayed in the first user terminal and the second user terminal.

BRIEF DESCRIPTION OF THE DRAWINGS

To describe the technical solutions of the embodiments of the present invention or the prior art more clearly, the following briefly introduces the accompanying drawings required for describing the embodiments or the prior art. Apparently, the accompanying drawings in the following description show only some embodiments of the present invention, and a person of ordinary skill in the art may still derive other drawings from these accompanying drawings without creative efforts.

DESCRIPTION OF EMBODIMENTS

To make the objectives, technical solutions, and advantages in the present invention clearer, the following further describes the implementation manners of the present invention in detail with reference to the accompanying drawings.

Figure 1:
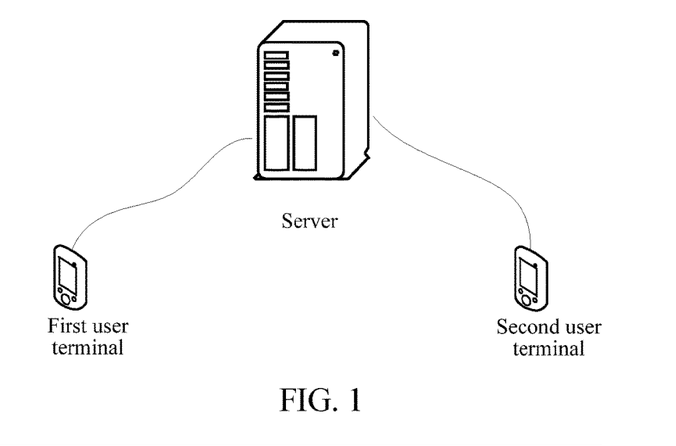
FIG. 1 is an architecture diagram of a time synchronization system provided in an embodiment of the present invention.

FIG. 1 is an architecture diagram of a time synchronization system provided in an embodiment of the present invention. Referring to FIG. 1, a time synchronization system includes a first user terminal, a second user terminal, and a server. The first user terminal and the server are connected through a network, and the second user terminal and the server are connected through a network.

The first user terminal and the second user terminal are both configured to install and run various network applications, and are further configured to receive an operation request submitted by a user in an interface of a network application, and communicate with the server according to the operation request. In a process that the first user terminal and the second user terminal run the network application, the first user terminal and the second user terminal are further configured to display a remaining processing time of processing network data included in the network application of the user. The server is configured to provide data required for running the network application, and is further configured to record user information that the user uses to register with the network application, and when the user logs in to the network application, to verify the identity of the user according to the recorded user information to determine whether to allow a request of logging in to the network application of the user. The server is further configured to synchronize, to the second user terminal, information of network data processed by the first user terminal, and certainly, is further configured to synchronize, to the first user terminal, information of network data processed by the second user terminal.

Figure 2:
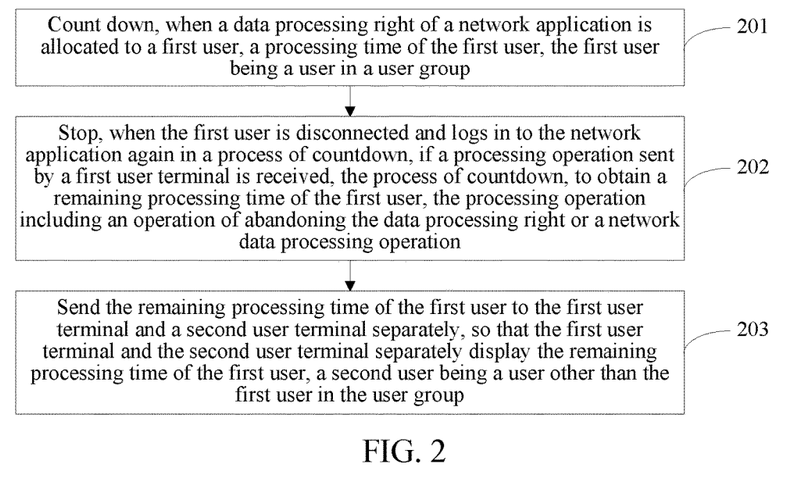
FIG. 2 is a flowchart of a first time synchronization method provided in an embodiment of the present invention.

FIG. 2 is a flowchart of a time synchronization method provided in an embodiment of the present invention. Referring to FIG. 2, the method includes:

Step 201: Count down, when a data processing right of a network application is allocated to a first user, a processing time of the first user, the first user being a user in a user group.

Step 202: Stop, when the first user is disconnected and logs in to the network application again in a process of countdown, if a processing operation sent by a first user terminal is received, the process of countdown, to obtain a remaining processing time of the first user, the processing operation including an operation of abandoning the data processing right or a network data processing operation.

Step 203: Send the remaining processing time of the first user to the first user terminal and a second user terminal separately, so that the first user terminal and the second user terminal separately display the remaining processing time of the first user, a second user being a user other than the first user in the user group.

In the embodiment of the present invention, when a server allocates, to a first user, a processing right of processing network data included in a network application, a processing time of the first user is counted down; when the first user is disconnected and logs in to the network application again in a process of countdown, if the server receives a processing operation sent by a first user terminal, countdown of the processing time of the first user is stopped to obtain a remaining processing time of the first user; and the remaining processing time of the first user is separately sent to the first user terminal and a second user terminal. The remaining processing time is a remaining processing time that is being updated by the server when the first user terminal is disconnected and logs in again, that is, the remaining processing time is an actual remaining processing time of the first user, thereby preventing an error from occurring in time displayed in the first user terminal and the second user terminal.

Optionally, when the processing operation is the network data processing operation, the processing operation carries position information of a position where processed network data is located in an interface of the network application; and after the sending the remaining processing time of the first user to the first user terminal and a second user terminal separately, the method further includes:

sending, to the second user terminal, the position information of the position where the processed network data is located in the interface of the network application, so that the second user terminal displays the processed network data of the first user according to the position information.

Optionally, the method further includes:

receiving, when the first user terminal receives a switching instruction of switching the network application from a background to a foreground, or when the first user terminal is disconnected and logs in to the network application again but does not have a processing right, an acquisition request sent by the first user terminal, the acquisition request carrying a user group identifier;

acquiring a remaining processing time of each user in the user group according to the user group identifier; and sending the remaining processing time of each user to the first user terminal, so that the first user terminal displays the remaining processing time of each user.

All the possible implementation solutions above may be combined randomly to form a possible embodiment of the present invention without being further elaborated.

Figure 3:
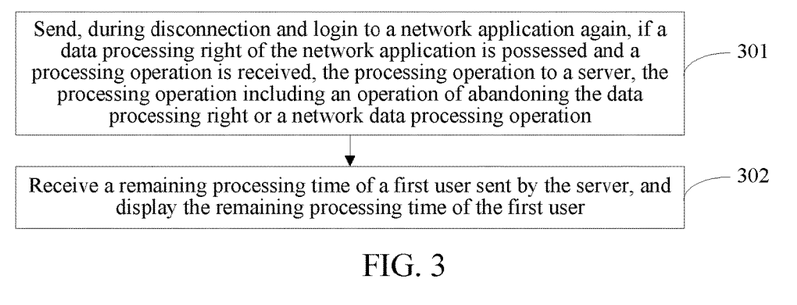
FIG. 3 is a flowchart of a second time synchronization method provided in an embodiment of the present invention.

FIG. 3 is a flowchart of a time synchronization method provided in an embodiment of the present invention. Referring to FIG. 3, the method includes:

Step 301: Send, during disconnection and login to a network application again, if a data processing right of the network application is possessed and a processing operation is received, the processing operation to a server, the processing operation including an operation of abandoning the data processing right or a network data processing operation.

Step 302: Receive a remaining processing time of a first user sent by the server, and display the remaining processing time of the first user.

In the embodiment of the present invention, when a server allocates, to a first user, a processing right of processing network data included in a network application, a processing time of the first user is counted down; when the first user is disconnected and logs in to the network application again in a process of countdown, if the server receives a processing operation sent by a first user terminal, countdown of the processing time of the first user is stopped to obtain a remaining processing time of the first user; and the remaining processing time of the first user is separately sent to the first user terminal and a second user terminal. The remaining processing time is a remaining processing time that is being updated by the server when the first user terminal is disconnected and logs in again, that is, the remaining processing time is an actual remaining processing time of the first user, thereby preventing an error from occurring in time displayed in the first user terminal and the second user terminal.

Optionally, the sending the processing operation to a server includes:

acquiring, when the processing operation is the network data processing operation, position information of a position where processed network data is located in an interface of the network application; and adding the position information to the processing operation and sending the processing operation to the server.

Optionally, the method further includes:

sending, when a switching instruction of switching the network application from a background to a foreground is received, or during disconnection and login to the network application again but the data processing right is not possessed, an acquisition request to the server, the acquisition request carrying a user group identifier, so that the server acquires a remaining processing time of each user in a user group according to the user group identifier; and receiving the remaining processing time of each user sent by the server, and displaying the remaining processing time of each user.

All the possible implementation solutions above may be combined randomly to form a possible embodiment of the present invention without being further elaborated herein.

Figure 4A:
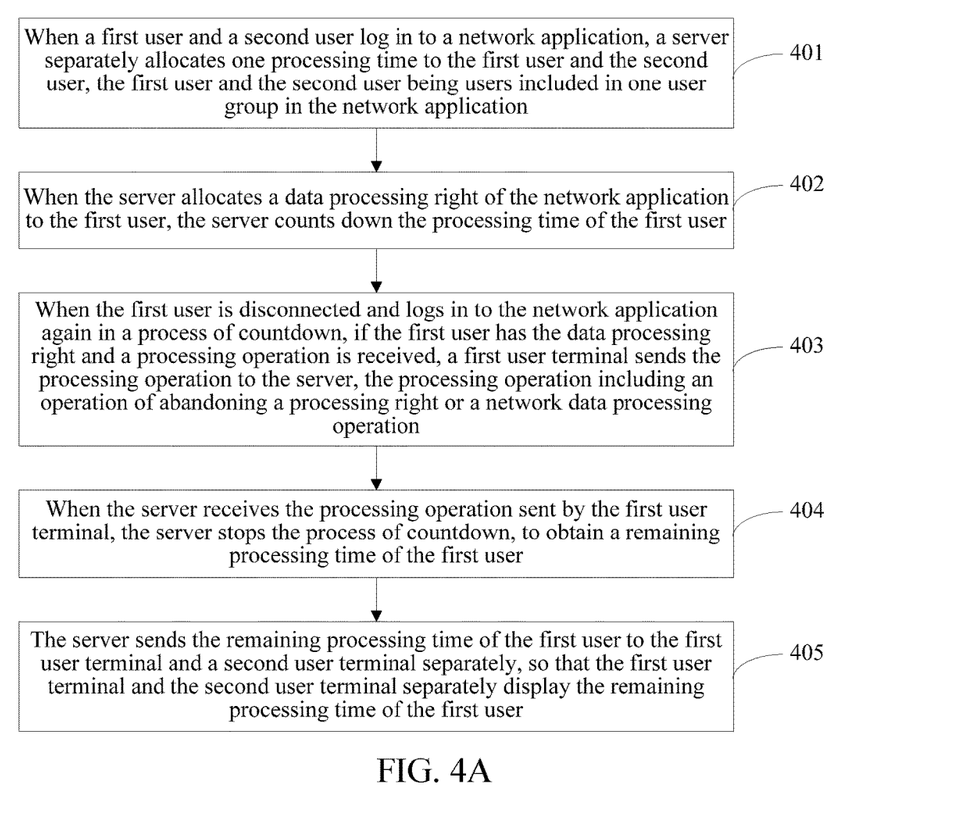
FIG. 4A is a flowchart of a third time synchronization method provided in an embodiment of the present invention.

FIG. 4A is a flowchart of a time synchronization method provided in an embodiment of the present invention. Referring to FIG. 4A, the method includes:

Step 401: When a first user and a second user log in to a network application, a server separately allocates one processing time to the first user and the second user, the first user and the second user being users included in one user group in the network application.

Specifically, when the first user and the second user log in to the network application, the server separately allocates one processing time to the first user and the second user, and delivers the processing time of the first user and the processing time of the second user to a first user terminal and a second user terminal, respectively.

Further, when the first user terminal receives the processing time of the first user and the processing time of the second user, the first user terminal displays the processing time of the first user and the processing time of the second user. When the second user terminal receives the processing time of the first user and the processing time of the second user, the second user terminal displays the processing time of the first user and the processing time of the second user.

The processing time allocated to the first user by the server and the processing time allocated to the second user by the server may be equal or may also be unequal. For example, when the first user is a designated user, and the second user is an undesignated user, the processing time allocated to the first user may be greater than the processing time allocated to the second user. When the first user and the second user are both designated users, or are both undesignated users, the processing time allocated to the first user and the processing time allocated to the second user may be equal. When the network application is a gomoku game, the designated user may be a member user, or may also a user whose game level is a designated level.

The first user and the second user may log in to the network application in multiple login manners, which are described in the embodiment of the present invention by using the following method as an example.

The first user terminal sends a first login request to the server, where the first login request carries a username and a password of the first user. When the server receives the first login request sent by the first user terminal, the server acquires, according to the username of the first user, a corresponding password from a stored correspondence between a username and a password, and compares the acquired password with the password carried in the first login request. If the acquired password is the same as the password carried in the first login request, the identity of the first user is verified, and the first user successfully logs in to the network application. The second user terminal sends a second login request to the server, where the second login request carries a username and a password of the second user. When the server receives the second login request sent by the second user terminal, the server acquires, according to the username of the second user, a corresponding password from the stored correspondence between a username and a password, and compares the acquired password with the password carried in the second login request. If the acquired password is the same as the password carried in the second login request, the identity of the second user is verified, and the second user successfully logs in to the network application.

It should be further noted that in the embodiment of the present invention, for illustration purposes, the first user terminal is a terminal corresponding to the first user, and the second user terminal is a terminal corresponding to the second user.

In addition, the network application may include multiple user groups, each user group includes at least two users, and each user has a chance to be allocated with a data processing right (or permission) of the network application. When a user is allocated with the data processing right, the user can process network data included in the network application.

Step 402: When the server allocates a data processing right of the network application to the first user, the server counts down the processing time of the first user.

In the embodiment of the present invention, at least two users included in the user group may be sequenced, and according to a sequence of the at least two users, the data processing right of the network application is allocated to the at least two users. For example, when the user group includes 3 users, that is, a user 1, a user 2, and a user 3, and a sequence of the 3 users is the user 2, the user 1, and the user 3, the data processing right is first allocated to the user 2, after the user 2 releases the data processing right, the data processing right is allocated to the user 1, and after the user 3 releases the data processing right, the data processing right is further allocated to the user 3. When the user group includes 2 users, this case is relatively simple, in which the data processing right may be first allocated to one of the users, and after the user releases the data processing right, the data processing right is then allocated to the other user; the allocation is performed in such a cycle.

When at least two users included in the user group are sequenced, the users may be sequenced according to initials of nicknames of the at least two users, or may also be sequenced according to levels of the at least two users, or certainly, the at least two users may also be sequenced randomly, which is not specifically limited in the embodiment of the present invention.

It should be noted that the time during which each user has the data processing right may be fixed or may also be not fixed. That is, an operation of releasing the data processing right may be triggered by the server, or may also be actively triggered by a user. When the operation of releasing the data processing right is triggered by the server, the time during which the user has the data processing right is fixed, and when the operation of releasing the data processing right is actively triggered by a user, the time that the user has the data processing right is not fixed.

When the operation of releasing the data processing right is triggered by the server, a specific operation may be as follows. When allocating the data processing right to a user, the server starts to count time. When the counted time reaches a fixed time and the server still does not receive a processing operation of the user, the server cancels the data processing right of the user and allocates the data processing right to another user.

When the operation of releasing the data processing right is actively triggered by a user, a specific operation may be as follows. After the server allocates the data processing right to the user, if the server receives the processing operation of the user, the server determines that the user releases the data processing right and allocates the data processing right to another user.

For a gomoku game, the processing operation may be an operation of placing a stone of a user. For a Dou Dizhu game, the processing operation may be an operation of playing a card of the user, or may also be an operation of skipping card playing of the user.

Step 403: When the first user is disconnected and logs in to the network application again in a process of countdown, if the first user has the data processing right and a processing operation is received, a first user terminal sends the processing operation to the server, the processing operation including an operation of abandoning a processing right or a network data processing operation.

Because countdown is performed by the server, when the first user is disconnected, if the first user still has the data processing right, the server keeps counting down the processing time of the first user, until the data processing right of the first user is released.

When the first user logs in to the network application again, if the first user still has the data processing right, the user may still continue to perform an operation.

When the processing operation is the network data processing operation, the first user terminal acquires position information of a position where processed network data is located in an interface of the network application, and adds the position information to the processing operation and sends the processing operation to the server. For example, for a gomoku game, when the first user places a stone, the first user terminal acquires position information of a position where the stone is located in a board, and adds the position information to the processing operation and sends the processing operation to the server.

Because a board is displayed in the interface of the network application and a stone can only be placed in the board, the position information of the position where the processed network data is located in the interface of the network application is position information of a position where a stone is located in the board.

For a Dou Dizhu game, when the processing operation is the network data processing operation, the first user terminal acquires the processed network data, and adds the processed network data to the processing operation and sends the processing operation to the server. For example, when the first user plays one pair of 2, in this case, the first user terminal adds the pair of 2 played by the first user to the processing operation and sends the processing operation to the server.

Step 404: When the server receives the processing operation sent by the first user terminal, the server stops the process of countdown, to obtain a remaining processing time of the first user.

Specifically, when receiving the processing operation sent by the first user terminal, the server determines that the first user releases the data processing right, and stops countdown of the processing time of the first user to obtain the remaining processing time of the first user.

Further, in the embodiment of the present invention, a timer may be set to count down the processing time of the first user, and when the process of countdown stops, the remaining processing time of the first user is obtained. When the data processing right is allocated to the first user a next time, the timer continues countdown from the remaining processing time at the stop last time.

To reflect the elapse of time in a game, in a process that the server counts down the processing time of the first user, a first user terminal and a second user terminal also display countdown of the processing time of the first user. Moreover, when the data processing right possessed by the first user is released, the first user terminal and the second user terminal stop the process of countdown. However, eventually the first user terminal and the second user terminal also display a result of countdown by the server, thereby ensuring that same time is displayed in the first user terminal and the second user terminal.

Step 405: The server sends the remaining processing time of the first user to the first user terminal and a second user terminal separately, so that the first user terminal and the second user terminal separately display the remaining processing time of the first user.

Because the first user terminal and the second user terminal both display the remaining processing time of the first user and a remaining processing time of the second user, when the first user terminal and the second user terminal separately receive the remaining processing time of the first user, the first user terminal and the second user terminal separately display the remaining processing time of the first user at a position corresponding to the first user.

Figure 4B:
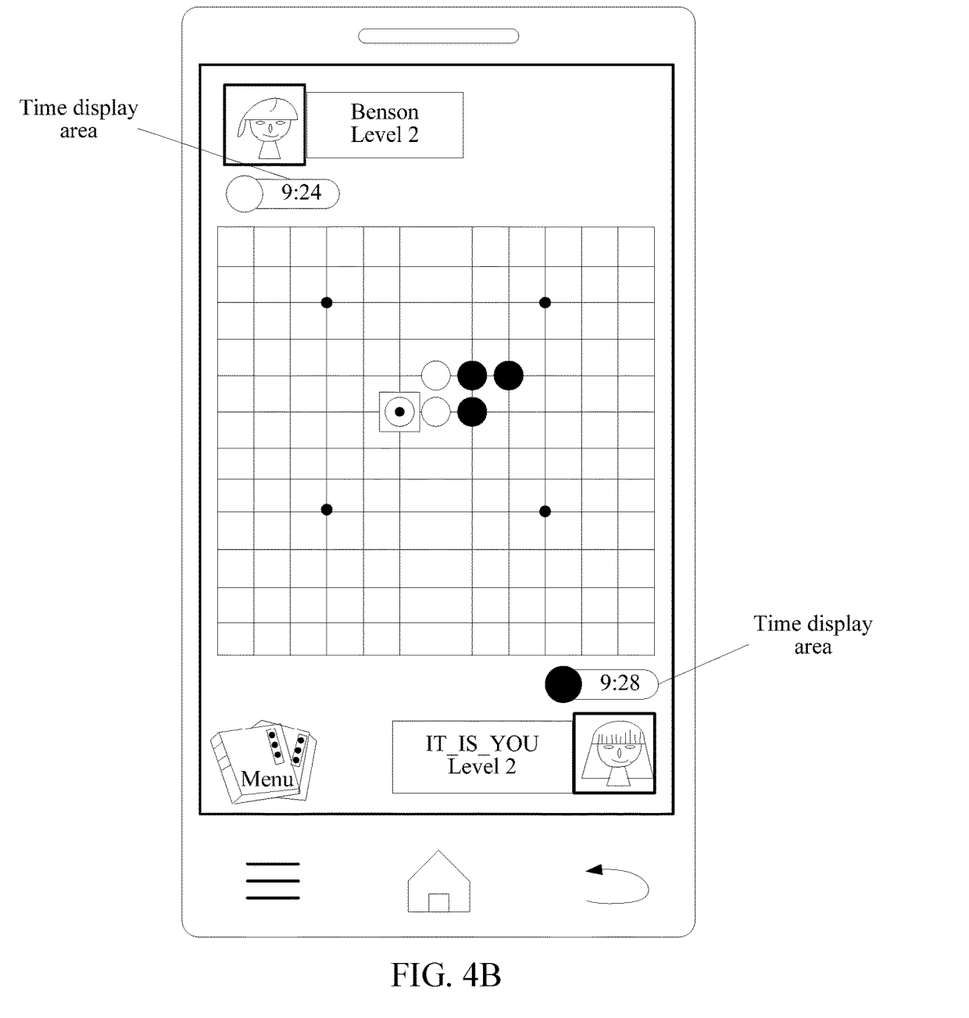
FIG. 4B is a schematic diagram of an interface of a network application provided in an embodiment of the present invention.

For example, for a schematic diagram of an interface of a gomoku game shown in FIG. 4B, the interface includes a network data display area, an avatar, a nickname, and a level of a user included in a user group, and a time display area for a remaining processing time of a user. When the interface is a game interface displayed in the first user terminal, the remaining processing time of the second user is the displayed in a time display area at the upper left corner of the interface of the gomoku, and the remaining processing time of the first user is displayed in a time display area at the lower right corner. When the first user terminal receives the remaining processing time of the first user, the first user terminal displays the received remaining processing time in the time display area at the lower right corner shown in FIG. 4B. When the interface is a game interface displayed in the second user terminal, the remaining processing time of the first user is displayed in the time display area at the upper left corner of the interface of the gomoku, and the remaining processing time of the second user is displayed in the time display area at the lower right corner. When the second user terminal receives the remaining processing time of the first user, the second user terminal displays the received remaining processing time in the time display area at the upper left corner shown in FIG. 4B.

Further, when in step 403 the processing operation carries position information of a position where the processed network data is located in the interface of the network application, the server sends the position information to the second user terminal, so that the second user terminal displays the processed network data of the first user in the interface of the network application of the second user terminal according to the position information.

In a process that the first user uses the network application, if a mobile phone of the first user has an incoming call or the first user wants to use another application program on the desktop of mobile phone, the user needs to switch the network application from a foreground to a background. When the first user finishes the call or finishes the use of another application program on the desktop of the mobile phone, the network application may also be switched from a background to a foreground. Because when the network application runs in a background, countdown of the remaining time displayed in the terminal stops, when the network application is switched from a background to a foreground, to acquire an accurate remaining processing time, the first user terminal may actively query a remaining processing time of each user from the server by using an active query interface.

Alternatively, when the first user is disconnected and logs in to the network application again, if the first user does not have the data processing right, in this case, the first user terminal may also actively query a remaining processing time of each user from the server by using an active query interface.

When the first user terminal actively quires the remaining processing time of each user from the server, a specific operation is that: When the first user terminal receives a switching instruction of switching the network application from a background to a foreground, or when the first user is disconnected and logs in to the network application again but does not have the data processing right, the first user terminal sends an acquisition request to the server, the acquisition request carrying a user group identifier, so that the server acquires the remaining processing time of each user in the user group according to the user group identifier. When the first user terminal receives the remaining processing time of each user sent by the server, the first user terminal displays the remaining processing time of each user.

When at least two users form one user group, the server allocates one user group identifier to the user group. Certainly, the user group identifier may also be set by the user in the user group and notified to the server. The server may use the user group identifier to uniquely identify the user group, and identify the users included in the user group. That is, the server may store a correspondence between the user group identifier and a user identifier included in the user group.

Therefore, when the server acquires the remaining processing time of each user in the user group according to the user group identifier, a specific operation may be as follows. The server acquires, according to the user group identifier, a user identifier included in the user group from the stored correspondence between a user group identifier and a user identifier; and acquires, according to the user identifier included in the user group, the remaining processing time of the user included in the user group.

When a timer is used to count a remaining time of a user, a timer corresponding to the user may be found according to the user identifier, and a remaining processing time recorded by the timer is determined as the remaining processing time of the user.

The process in Steps 402 to 405 above is to, when the server allocates the data processing right to the first user and when the first user is disconnected and logs in to the network application again in a process that the first user has the data processing right, ensure that the time displayed by the first user terminal and the time displayed by the second user terminal are correct and kept consistent. Similarly, when the server allocates the data processing right to the second user and when the second user is disconnected and logs in to the network application again in a process that the second user has the data processing right, it may also be ensured according to the foregoing process that the time displayed by the first user terminal and the time displayed by the second user terminal are correct and kept consistent.

In the embodiment of the present invention, when a server allocates, to a first user, a processing right of processing network data included in a network application, a processing time of the first user is counted down; when the first user is disconnected and logs in to the network application again in a process of countdown, if the server receives a processing operation sent by a first user terminal, countdown of the processing time of the first user is stopped to obtain a remaining processing time of the first user; and the remaining processing time of the first user is separately sent to the first user terminal and a second user terminal. The remaining processing time is a remaining processing time that is being updated by the server when the first user terminal is disconnected and logs in again, that is, the remaining processing time is an actual remaining processing time of the first user, thereby preventing an error from occurring in time displayed in the first user terminal and the second user terminal.

Figure 5:
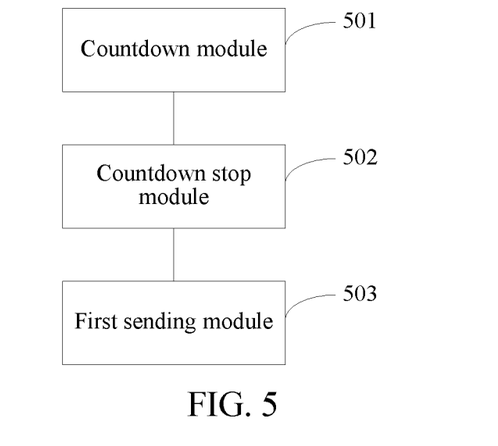
FIG. 5 is a schematic structural diagram of a time synchronization apparatus provided in an embodiment of the present invention.

FIG. 5 is a schematic structural diagram of a time synchronization apparatus provided in an embodiment of the present invention. Referring to FIG. 5, the apparatus includes:

a countdown module 501, configured to count down, when a data processing right of a network application is allocated to a first user, a processing time of the first user, the first user being a user in a user group;

a countdown stop module 502, configured to stop, when the first user is disconnected and logs in to the network application again in a process of countdown, if a processing operation sent by a first user terminal is received, the process of countdown, to obtain a remaining processing time of the first user, the processing operation including an operation of abandoning the data processing right or a network data processing operation; and a first sending module 503, configured to send the remaining processing time of the first user to the first user terminal and a second user terminal separately, so that the first user terminal and the second user terminal separately display the remaining processing time of the first user, a second user being a user other than the first user in the user group.

Optionally, when the processing operation is the network data processing operation, the processing operation carries position information of a position where processed network data is located in an interface of the network application; and the apparatus further includes:

a second sending module, configured to send, to the second user terminal, the position information of the position where the processed network data is located in the interface of the network application, so that the second user terminal displays the processed network data of the first user according to the position information.

Optionally, the apparatus further includes:

a receiving module, configured to receive, when the first user terminal receives a switching instruction of switching the network application from a background to a foreground, or when the first user terminal is disconnected and logs in to the network application again but does not have a processing right, an acquisition request sent by the first user terminal, the acquisition request carrying a user group identifier;

an acquisition module, configured to acquire a remaining processing time of each user in the user group according to the user group identifier; and a third sending module, configured to send the remaining processing time of each user to the first user terminal, so that the first user terminal displays the remaining processing time of each user.

In the embodiment of the present invention, when a server allocates, to a first user, a processing right of processing network data included in a network application, a processing time of the first user is counted down; when the first user is disconnected and logs in to the network application again in a process of countdown, if the server receives a processing operation sent by a first user terminal, countdown of the processing time of the first user is stopped to obtain a remaining processing time of the first user; and the remaining processing time of the first user is separately sent to the first user terminal and a second user terminal. The remaining processing time is a remaining processing time that is being updated by the server when the first user terminal is disconnected and logs in again, that is, the remaining processing time is an actual remaining processing time of the first user, thereby preventing an error from occurring in time displayed in the first user terminal and the second user terminal.

Figure 6:
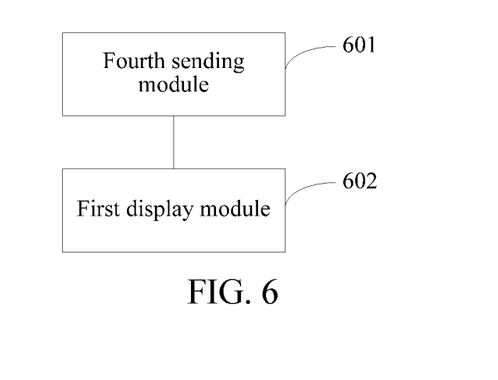
FIG. 6 is a schematic structural diagram of another time synchronization apparatus provided in an embodiment of the present invention.

FIG. 6 is a schematic structural diagram of a time synchronization apparatus provided in an embodiment of the present invention. Referring to FIG. 6, the apparatus includes:

a fourth sending module 601, configured to send, during disconnection and login to a network application again, if a data processing right of the network application is possessed and a processing operation is received, the processing operation to a server, the processing operation including an operation of abandoning the data processing right or a network data processing operation; and a first display module 602, configured to receive a remaining processing time of a first user sent by the server, and display the remaining processing time of the first user.

Optionally, the fourth sending module 601 includes:

an acquisition unit, configured to acquire, when the processing operation is the network data processing operation, position information of a position where processed network data is located in an interface of the network application; and a sending unit, configured to add the position information to the processing operation and send the processing operation to the server.

Optionally, the apparatus further includes:

a fifth sending module, configured to send, when a switching instruction of switching the network application from a background to a foreground is received, or during disconnection and login to the network application again but the data processing right is not possessed, an acquisition request to the server, the acquisition request carrying a user group identifier, so that the server acquires a remaining processing time of each user in a user group according to the user group identifier; and a second display module, configured to receive the remaining processing time of each user sent by the server, and display the remaining processing time of each user.

In the embodiment of the present invention, when a server allocates, to a first user, a processing right of processing network data included in a network application, a processing time of the first user is counted down; when the first user is disconnected and logs in to the network application again in a process of countdown, if the server receives a processing operation sent by a first user terminal, countdown of the processing time of the first user is stopped to obtain a remaining processing time of the first user; and the remaining processing time of the first user is separately sent to the first user terminal and a second user terminal. The remaining processing time is a remaining processing time that is being updated by the server when the first user terminal is disconnected and logs in again, that is, the remaining processing time is an actual remaining processing time of the first user, thereby preventing an error from occurring in time displayed in the first user terminal and the second user terminal.

It should be noted that when the time synchronization apparatus provided in the foregoing embodiments, the foregoing division of functional modules is only used as an example for description. In practical applications, the foregoing functions may be allocated to be accomplished by different functional modules as needed, that is, the internal structure of the apparatus is divided into different functional modules to accomplish all or some of the functions described above. In addition, the time synchronization apparatus provided in the foregoing embodiments shares the same/similar concept with the embodiments of the time synchronization method, and reference may be made to the method embodiments for the specific implementation process of the apparatus, without being further elaborated herein.

The sequence numbers of the above embodiments of the present invention are merely for the convenience of description, and do not imply any preference among the embodiments.

A person of ordinary skill in the art may understand that all or some of the steps of the foregoing embodiments may be implemented by using hardware, and/or may be implemented by a program instructing relevant hardware. The program may be stored in a non-transitory computer readable storage medium. The storage medium may be a read-only memory, a magnetic disk, an optical disc, or the like.

For example, the disclosed methods can be implemented by device(s), terminal(s), and server(s) each including one or more processor, and a non-transitory computer-readable storage medium having instructions stored thereon. The instructions can be executed by the one or more processors thereof to implement the methods disclosed herein. In some cases, the instructions can include one or more modules corresponding to the disclosed methods.

Figure 7:
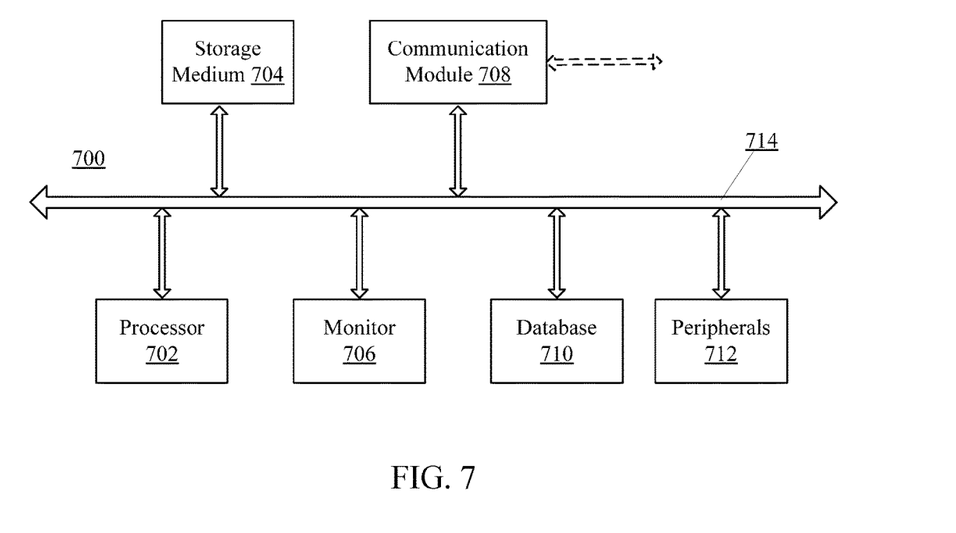
FIG. 7 illustrates an exemplary computer system consistent with various disclosed embodiments.

In various embodiments, the device(s), terminal(s), server(s), and/or various modules/units disclosed herein may be implemented using one or more computing systems. FIG. 7 illustrates an exemplary computing system.

As shown in FIG. 7, a computing system 700 may include a processor 702, a storage medium 704, a monitor 706, a communication module 708, a database 710, peripherals 712, and one or more bus 714 to couple the devices together. Certain devices may be omitted and other devices may be included.

Processor 702 can include any appropriate processor or processors. Further, processor 702 can include multiple cores for multi-thread or parallel processing. Storage medium 704 may include memory modules, such as ROM, RAM, and flash memory modules, and mass storages, such as CD-ROM, U-disk, removable hard disk, etc. Storage medium 704 may store computer programs for implementing various processes, when executed by processor 702.

Further, peripherals 712 may include I/O devices such as keyboard and mouse, and communication module 708 may include network devices for establishing connections through a communication network. Database 710 may include one or more databases for storing certain data and for performing certain operations on the stored data, such as webpage browsing, database searching, etc.

The processor(s) 702 can upload executable files corresponding to processes of one or more programs/instructions to the storage medium 704, such as a non-transitory storage medium. The processor(s) 702 can then be used to run these one or more programs stored in the storage medium 704. For example, the processor(s) 702 can cause the exemplary device to perform disclosed information viewing methods.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A time synchronization method, comprising:
    maintaining, by a server, status information of a network application jointly accessed by a user group, the user group including at least a first user logged in on a first user terminal and a second user logged in on a second user terminal, wherein users in the user group take turns to claim a data processing right for performing data processing operations on the network application and to send the data processing operations to the server, the status information includes at least an identifier of a user currently having the data processing right;
    counting down, by the server, when the data processing right of the network application is allocated to the first user, a processing time of the first user, wherein the processing time of the first user indicates a time limit assigned to the first user for making one or more data processing operations;
    receiving, by the server, a data processing operation sent by the first user terminal after a first time period is passed since the data processing right is allocated to the first user, wherein the first user terminal is disconnected and logs in to the network application again during the first time period while the server is counting down the processing time of the first user;
    in response to the data processing operation received from the first user terminal, stopping, by the server, countdown of the processing time of the first user to obtain a remaining processing time of the first user, the remaining processing time being a time at where the count-down of the processing time is stopped; and
    sending, by the server, the remaining processing time of the first user to the first user terminal and the second user terminal separately, so that the first user terminal and the second user terminal separately display the same remaining processing time of the first user.

2. The method according to claim 1, wherein the data processing operation carries position information of a position where processed network data is located in an interface of the network application; and
    after the sending the remaining processing time to the first user terminal and the second user terminal separately, the method further comprises:
    sending, to the second user terminal, the position information of the position where the processed network data is located in the interface of the network application, so that the second user terminal displays the processed network data according to the position information.

3. The method according to claim 1, wherein the method further comprises:
    receiving, by the server, when the first user terminal receives a switching instruction of switching the network application from a background to a foreground, or when the first user terminal is disconnected and logs in to the network application again but does not have the data processing right, an acquisition request sent by the first user terminal, the acquisition request carrying a user group identifier;
    acquiring remaining processing times of the users in the user group according to the user group identifier; and
    sending the remaining processing times of the users to the first user terminal, so that the first user terminal displays the remaining processing times of the users.

4. The method according to claim 1, further comprising:
    sending, by the first user terminal, after disconnection and login to the network application again, if the data processing right of the network application is possessed and the data processing operation is received, the data processing operation to the server; and
    receiving, by the first terminal, the remaining processing time of the first user sent by the server, and displaying the remaining processing time of the first user.

5. The method according to claim 4, wherein the sending the data processing operation to the server comprises:

acquiring, by the first user terminal, position information of a position where processed network data is located in an interface of the network application; and adding the position information to the data processing operation and sending the data processing operation to the server.

6. The method according to claim 4, wherein the method further comprises:

sending, by the first user terminal, when a switching instruction of switching the network application from a background to a foreground is received by the first terminal, or when the first terminal logs in to the network application again after a disconnection and the data processing right is not allocated to the first user, an acquisition request to the server, the acquisition request carrying a user group identifier, so that the server acquires remaining processing times of the users in the user group according to the user group identifier; and receiving the remaining processing times of the users in the user group sent by the server, and displaying the remaining processing times of the users.

7. A time synchronization apparatus applied to a server, comprising:

a memory; and a processor coupled to the memory, wherein the processor is configured to:

maintain status information of a network application jointly accessed by a user group, the user group including at least a first user logged in on a first user terminal and a second user logged in on a second user terminal, wherein users in the user group take turns to claim a data processing right for performing data processing operations on the network application and to send the data processing operations to the server, the status information includes at least an identifier of a user currently having the data processing right;

count down, when the data processing right of the network application is allocated to the first user, a processing time of the first user, wherein the processing time of the first user indicates a time limit assigned to the first user for making one or more data processing operations;

receive a data processing operation sent by the first user terminal after a first time period is passed since the data processing right is allocated to the first user, wherein the first user terminal is disconnected and logs in to the network application again during the first time period while the server is counting down the processing time of the first user;

in response to the data processing operation received from the first user terminal, stop count-down of the processing time of the first user to obtain a remaining processing time of the first user, the remaining processing time being a time at where the count-down of the processing time is stopped; and send the remaining processing time of the first user to the first user terminal and the second user terminal separately, so that the first user terminal and the second user terminal separately display the same remaining processing time.

8. The apparatus according to claim 7, wherein the data processing operation carries position information of a position where processed network data is located in an interface of the network application; and the processor is further configured to send, to the second user terminal, the position information of the position where the processed network data is located in the interface of the network application, so that the second user terminal displays the processed network data according to the position information.

9. The apparatus according to claim 7, wherein the processor is further configured to:

receive, when the first user terminal receives a switching instruction of switching the network application from a background to a foreground, or when the first user terminal is disconnected and logs in to the network application again but does not have the data processing right, an acquisition request sent by the first user terminal, the acquisition request carrying a user group identifier;

acquire remaining processing times of the users in the user group according to the user group identifier; and send the remaining processing times of the users to the first user terminal, so that the first user terminal displays the remaining processing times of the users.

10. A time synchronization apparatus applied to a first user terminal, comprising:

a memory; and a processor coupled to the memory, wherein the processor is configured to:

run a network application jointly accessed by a user group, the user group including at least a first user logged in on the first user terminal and a second user logged in on a second user terminal, wherein users in the user group take turns to claim a data processing right for performing data processing operations on the network application and to send the data processing operations to a server, and the server maintains status information of the network application, including at least an identifier of a user currently having the data processing right;

send, when the first user terminal logs in to the network application again after a disconnection, if the data processing right of the network application is allocated to the first user and a data processing operation is received by the first user terminal, the data processing operation to the server, wherein: if the data processing right is allocated to the first user, the server keeps counting down a processing time of the first user regardless of the disconnection until the server receives the data processing operation, and the processing time of the first user indicates a time limit assigned to the first user for making one or more data processing operations;

receive a remaining processing time of the first user sent by the server, the remaining processing time of the first user being a time at where the count-down of the processing time is stopped in response to the data processing operation received from the first user terminal; and display the remaining processing time of the first user.

11. The apparatus according to claim 10, wherein the processor is further configured to:

acquire, position information of a position where processed network data is located in an interface of the network application; and add the position information to the data processing operation and send the data processing operation to the server.

12. The apparatus according to claim 10, wherein the processor is further configured to:

send, when a switching instruction of switching the network application from a background to a foreground is received by the first terminal, or when the first terminal logs in to the network application again after the disconnection but the data processing right is not allocated to the first user, an acquisition request to the server, the acquisition request carrying a user group identifier, so that the server acquires remaining processing times of the users in the user group according to the user group identifier; and receive the remaining processing times of the users in the user group sent by the server, and display the remaining processing times of the users.

13. The method according to claim 2, wherein the method further comprises:

receiving, when the first user terminal receives a switching instruction of switching the network application from a background to a foreground, or when the first user terminal is disconnected and logs in to the network application again but does not have the data processing right, an acquisition request sent by the first user terminal, the acquisition request carrying a user group identifier;

acquiring remaining processing times of the users in the user group according to the user group identifier; and sending the remaining processing times of the users to the first user terminal, so that the first user terminal displays the remaining processing times of the users.

14. The method according to claim 5, wherein the method further comprises:

sending, when a switching instruction of switching the network application from a background to a foreground is received by the first terminal, or when the first user terminal logs in to the network application again after a disconnection but the data processing right is not allocated to the first user, an acquisition request to the server, the acquisition request carrying a user group identifier, so that the server acquires remaining processing times of the users in the user group according to the user group identifier; and receiving the remaining processing times of the users sent by the server, and displaying the remaining processing times of the users.

15. The apparatus according to claim 8, wherein the processor is further configured to:

receive, when the first user terminal receives a switching instruction of switching the network application from a background to a foreground, or when the first user terminal is disconnected and logs in to the network application again but does not have the data processing right, an acquisition request sent by the first user terminal, the acquisition request carrying a user group identifier;

acquire remaining processing times of the users in the user group according to the user group identifier; and send the remaining processing times of the users to the first user terminal, so that the first user terminal displays the remaining processing times of the users.

16. The apparatus according to claim 11, wherein the processor is further configured to:

send, when a switching instruction of switching the network application from a background to a foreground is received, or when the first user terminal logs in to the network application again after a disconnection but the data processing right is not allocated to the first user, an acquisition request to the server, the acquisition request carrying a user group identifier, so that the server acquires remaining processing times of the users in the user group according to the user group identifier; and receive the remaining processing times of the users sent by the server, and display the remaining processing times of the users.

17. The method according to claim 1, wherein the network application is a network gaming application jointly accessed by the user group.

18. The method according to claim 17, wherein the data processing operation is a game move performed on a game interface corresponding to the network gaming application.

19. The method according to claim 17, wherein the network gaming application is a turn-based game; and the data processing right being allocated to the first user indicates that a game move is to be performed by the first user in a current turn.

20. The method according to claim 18, further comprising:

simultaneously displaying, by the first terminal, the remaining processing time of the first user and a remaining processing time of the second user on the game interface.

\* \* \* \* \*